(12) United States Patent
Noble et al.

(10) Patent No.: US 11,061,141 B2
(45) Date of Patent: Jul. 13, 2021

(54) SYSTEMS AND METHODS FOR DISTRIBUTED DENSE NETWORK PROCESSING OF SATELLITE POSITIONING DATA

(71) Applicant: Swift Navigation, Inc., San Francisco, CA (US)

(72) Inventors: Fergus Noble, San Francisco, CA (US); Anthony Cole, San Francisco, CA (US)

(73) Assignee: Swift Navigation, Inc., San Francisco, CA (US)

( * ) Notice: Subject to any disclaimer, the term of this patent is extended or adjusted under 35 U.S.C. 154(b) by 0 days.

(21) Appl. No.: 16/589,932

(22) Filed: Oct. 1, 2019

(65) Prior Publication Data

US 2020/0041654 A1 Feb. 6, 2020

Related U.S. Application Data

(63) Continuation of application No. 16/195,427, filed on Nov. 19, 2018, now Pat. No. 10,473,790.

(Continued)

(51) Int. Cl.
*G01S 19/04* (2010.01)
*G01S 19/07* (2010.01)
(Continued)

(52) U.S. Cl.
CPC .......... *G01S 19/072* (2019.08); *G01S 19/04* (2013.01); *G01S 19/06* (2013.01); *G01S 19/07* (2013.01); *G01S 19/256* (2013.01); *G01S 19/40* (2013.01)

(58) Field of Classification Search
CPC ........ G01S 19/072; G01S 19/04; G01S 19/06; G01S 19/07; G01S 19/256; G01S 19/40;
(Continued)

(56) References Cited

U.S. PATENT DOCUMENTS 5,610,614 A 3/1997 Talbot et al.
6,427,122 B1 7/2002 Lin
(Continued)

FOREIGN PATENT DOCUMENTS

| EP | 0244091 A2 | 11/1987 |
| EP | 1839070 B2 | 4/2014 |
| WO | 2017070732 A1 | 5/2017 |

OTHER PUBLICATIONS

"An Introduction to GNSS, Chapter 4, GNSS Error Sources", https://novatel.com/an-introduction-to-gnss/chapter-4-gnsserror-sources, published 2015.
(Continued)

*Primary Examiner* — Harry K Liu
(74) *Attorney, Agent, or Firm* — Jeffrey Schox; Diana Lin

(57) ABSTRACT

A system for generating satellite positioning corrections includes a global correction module that generates a set of global pre-corrections based on modeling of global positioning error, a set of local correction modules that, for each local correction module of the set, takes input from a unique reference source and generates a set of local pre-corrections based on modeling of local positioning error; and a correction generator that generates a positioning correction from the set of global pre-corrections and the sets of local pre-corrections to correct a position of the mobile receiver.

16 Claims, 4 Drawing Sheets

Related U.S. Application Data

(60) Provisional application No. 62/587,741, filed on Nov. 17, 2017.

(51) Int. Cl.
  *G01S 19/25* (2010.01)
  *G01S 19/06* (2010.01)
  *G01S 19/40* (2010.01)

(58) Field of Classification Search
  CPC .......... G01S 19/41; G01S 19/20; G01S 19/08; G01S 5/009
  USPC .................................................... 342/357.44
  See application file for complete search history.

(56) References Cited

U.S. PATENT DOCUMENTS

| | | |
|---|---|---|
| 6,453,237 B1 | 9/2002 | Fuchs et al. |
| 6,856,905 B2 | 2/2005 | Pasturel et al. |
| 7,026,982 B2 | 4/2006 | Toda et al. |
| 7,289,061 B2 | 10/2007 | Komjathy et al. |
| 7,292,183 B2 | 11/2007 | Bird et al. |
| 8,094,065 B2 | 1/2012 | Henkel |
| 8,760,343 B2 | 6/2014 | Milyutin et al. |
| 8,825,456 B2 | 9/2014 | Vasudevan et al. |
| 9,128,176 B2 | 9/2015 | Seeger |
| 9,405,012 B2 | 8/2016 | Doucet et al. |
| 9,557,422 B1 | 1/2017 | Miller et al. |
| 9,784,844 B2 | 10/2017 | Kana et al. |
| 2005/0001762 A1 | 1/2005 | Han et al. |
| 2005/0024263 A1* | 2/2005 | Sharpe .................. G01S 19/072 342/357.31 |
| 2009/0018772 A1 | 1/2009 | Watanabe et al. |
| 2009/0184869 A1 | 7/2009 | Talbot et al. |
| 2009/0273511 A1 | 11/2009 | Schroth |
| 2010/0283675 A1 | 11/2010 | McAree et al. |
| 2011/0148698 A1 | 6/2011 | Vollath |
| 2011/0187589 A1 | 8/2011 | Gaal et al. |
| 2011/0187590 A1 | 8/2011 | Leandro |
| 2012/0154210 A1 | 6/2012 | Landau et al. |
| 2012/0176271 A1 | 7/2012 | Dai et al. |
| 2013/0050020 A1 | 2/2013 | Peck et al. |
| 2013/0227377 A1 | 8/2013 | Rao et al. |
| 2014/0184442 A1 | 7/2014 | Large et al. |
| 2014/0240172 A1 | 8/2014 | Milyutin et al. |
| 2015/0019464 A1 | 1/2015 | Nguyen-Tuong et al. |
| 2016/0097859 A1 | 4/2016 | Hansen et al. |
| 2017/0269222 A1 | 9/2017 | Dai et al. |
| 2017/0299730 A1* | 10/2017 | Lie ........................... G01S 19/43 |
| 2017/0322313 A1 | 11/2017 | Revol et al. |
| 2018/0113219 A1* | 4/2018 | Wuebbena .............. G01S 19/41 |
| 2018/0120445 A1* | 5/2018 | Dill ......................... G01S 19/04 |
| 2019/0004180 A1 | 1/2019 | Jokinen |
| 2019/0154837 A1 | 5/2019 | Noble et al. |
| 2019/0187298 A1 | 6/2019 | Grgich et al. |
| 2019/0204450 A1 | 7/2019 | Revol |
| 2019/0339396 A1 | 11/2019 | Turunen |
| 2020/0209406 A1 | 7/2020 | Lin et al. |

OTHER PUBLICATIONS

"Integrity monitoring for mobile users in urban environment", https://gssc.esa.int/navipedia/index.php/Integrity.

"Phase II of the GNSS Evolutionary Architecture Study", https://www.faa.gov/about/office_org/headquarters_offices/ato/service_units/techops/navservices/gnss/library/documents/media/geasphaseii_final.pdf, Feb. 2010.

Brocard, Philippe , "Integrity monitoring for mobile users in urban environment", https://tel.archives-ouvertes.fr/tel-01379632, Oct. 11, 2016.

Chiu, David S. , et al., "Bierman-Thorton UD Filtering for Double-Differenced Carrier Phase Estimation Accounting for Full Mathematical Correlation", Jan. 2008, ION NTM 2008, pp. 756-762., Jun. 23, 2017 00:00:00.0.

Gratton, Livio , et al., "Carrier Phase Relative RAIM Algorithms and Protection Level Derivation", Journal of Navigation (2010), 63, 215-231, doi: 10.1017/S0373463309990403.

Gunning, Kazuma , et al., "Design and evaluation of integrity algorithms for PPP in kinematic applications", Proceedings of the 31st International Technical Meeting of the Satellite Division of The Institute of Navigation (ION GNSS+ 2018) Sep. 24-28, 2018, Hyatt Regency Miami, Miami, Florida.

Karaim, Malek , et al., "GNSS Error Sources", https://www.intechopen.com/books/multifunctional-operation-and-application-of-gps/gnss-error-sources, published Apr. 6, 2018.

Khanafseh, Samer , et al., "GNSS Multipath Error Modeling for Automotive Applications", Abstract only, Proceedings of the 31st International Technical Meeting of the Satellite Division of the Institute of Navigation (ION GNSS+ 2018), Miami, Florida, Sep. 2018, pp. 1573-1589, https://www.ion.org/publications/abstract.cfm?articleID=16107.

Li, T. , et al., "Some remarks on GNSS integer ambiguity validation methods", Survey Review, Dec. 5, 2012, vol. 44, No. 326.

Pervan, Boris , et al., "Shaping Aviation Integrity Two RAIMs for Safety", GPS World The Business and Technology of Global Navigation and Positioning, Apr. 1, 2008.

Pullen, Sam , "Augmented GNSS: Fundamentals and Keys to Integrity and Continuity", Department of Aeronautics and Astronautics, Stanford University, Stanford, CA 94305-4035 USA, Tuesday, Sep. 20, 2011 1:30-5:00 PM Oregon Convention Center, Portland, Oregon.

Teunissen, P.J.G. , "GNSS Integer Ambiguity Validation: Overview of Theory and Methods", Proceedings of the ION 2013 Pacific PNT Meeting, Apr. 23-25, 2013, Marriott Waikiki Beach Resort & Spa, Honolulu, Hawaii, https://www.ion.org/publications/abstract.cfm?articleID=11030.

Teunissen, Peter J.G., et al., "Integer Aperture Estimation A Framework for GNSS Ambiguity Acceptance Testing", InsideGNSS, Mar./Apr. 2011, pp. 66-73, www.insidegnss.com.

Thombre, Sarang , et al., "GNSS great Monitoring and Reporting: Past, Present, and a Proposed Future", The Journal of Navigation, Dec. 2017, DOI: 10.1017/S0373463317000911, https://www.researchgate.net/publication/321663256.

Urquhart, Landon , et al., "Innovation: Integrity for safe navigation", https://www.gpsworld.com/innovation-integrity-for-safe-navigation-provided-by-gnss-service/, GPS World, Feb. 12, 2020.

Van Graas, Frank , et al., "Precise Velocity Estimation Using a Stand-Alone GPS Receiver", Abstract only, Journal of the Institute of Navigation, vol. 51, No. 4, Winter 2004-2005, pp. 283-292, https://www.ion.org/publications/abstract.cfm?articleID=102384.

Zhu, Ni , et al., "GNSS Position Integrity in Urban Environments: A Review of Literature", IEEE Transactions on Intelligent Transportation Systems, 2018, 17p., 10.1109/TITS.2017.2766768.hal-01709519.

C. E. Rasmussen & C. K. I. Williams, Gaussian Processes for Machine Learning, the MIT Press, 2006, ISBN 026218253X. c 2006 Massachusetts Institute of Technology. (Year: 2006).

Huang, P. "Airborne GNSS PPP Based Pseudolite System." School of Civil and Environmental Engineering Faculty of Engineering UNSW. Jun. 2019. (Year 2019).

Ming Lin, Xiaomin Song, Qi Qian, Hao Li, Liang Sun, Shenghuo Zhu, Rong Jin:Robust Gaussian Process Regression for Real-Time High Precision GPS Signal Enhancement. Jun. 5, 2019. (Year: 2019).

Satirapod, C. "Improving the GPS Data Processing Algorithm for Precise Static Relative Positioning." School of Surveying and Spatial Information Systems The University of New South Wales. Jan. 2002 . (Year: 2002).

* cited by examiner

SYSTEMS AND METHODS FOR DISTRIBUTED DENSE NETWORK PROCESSING OF SATELLITE POSITIONING DATA

CROSS-REFERENCE TO RELATED APPLICATIONS

This application is a continuation of U.S. patent application Ser. No. 16/195,427, filed on 19 Nov. 2018, which claims the benefit of U.S. Provisional Application Ser. No. 62/587,741, filed on 17 Nov. 2017, all of which are incorporated in its entirety by this reference.

TECHNICAL FIELD

This invention relates generally to the satellite positioning field, and more specifically to new and useful systems and methods for distributed dense network processing of satellite positioning data.

BACKGROUND

Being able to perform high precision satellite positioning is important for a wide variety of applications. Unfortunately, current GPS solutions are often either inaccurate or require processor power beyond the capabilities of inexpensive hardware (either locally or in the cloud). A number of solutions have been proposed to address this problem, including Network Real Time Kinematic (Network RTK) satellite positioning. Unfortunately, in traditional methods of Network RTK, the input parameter space increases non-linearly with the size of the network, making it very computationally costly to increase the network size (and thus coverage area and/or positioning accuracy). Therefore, there is the need in the satellite positioning field to create systems and methods for distributed dense network processing of satellite positioning data. This invention provides such new and useful systems and methods.

DESCRIPTION OF THE INVENTION EMBODIMENTS

Figure 1:
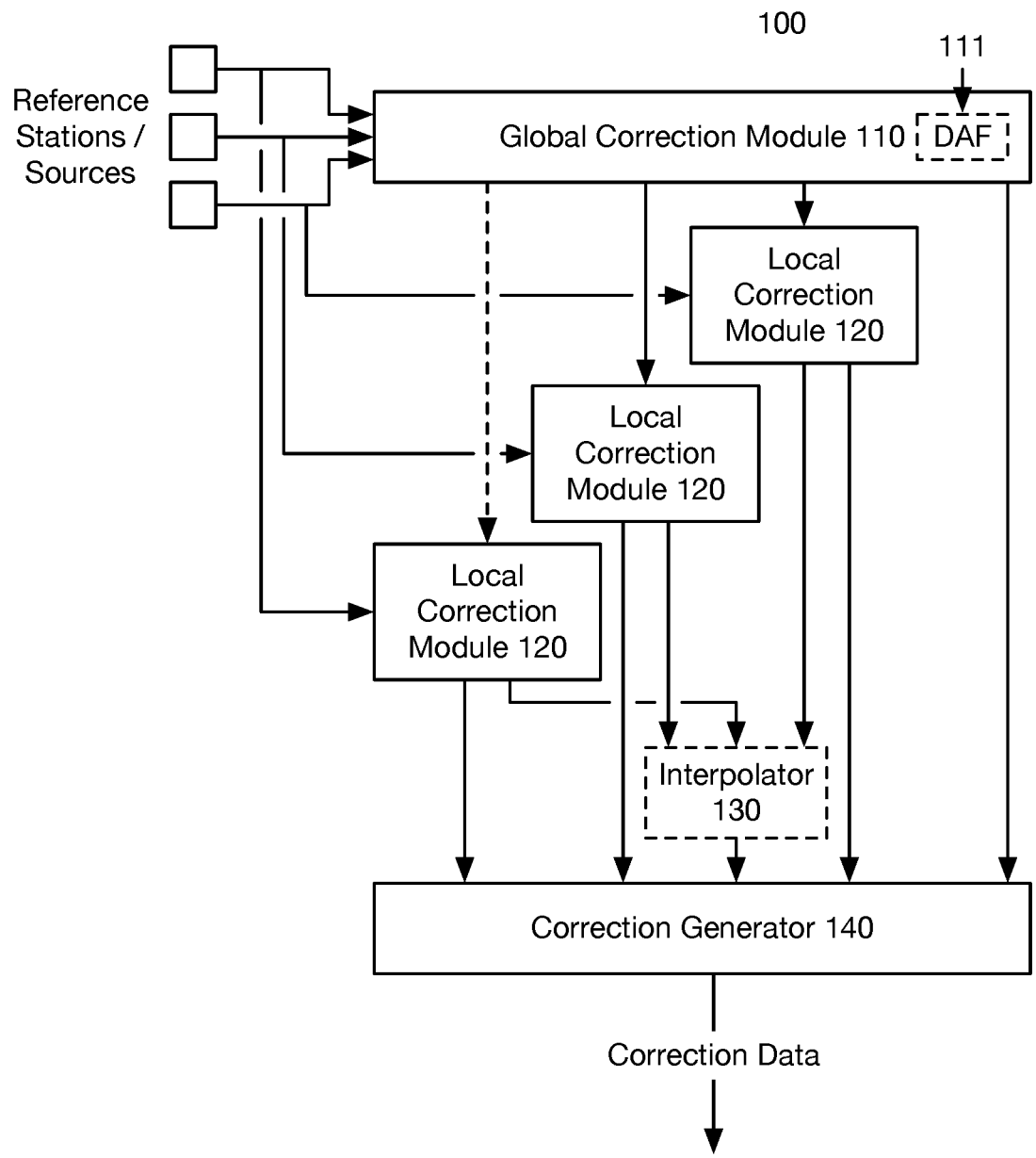
FIG. 1 is a diagram representation of a system of an invention embodiment.

The following description of the invention embodiments of the invention is not intended to limit the invention to these invention embodiments, but rather to enable any person skilled in the art to make and use this invention.

1. Traditional GNSS, PPP, and RTK

Traditional satellite positioning systems (e.g., standard GNSS) work by attempting to align a local copy (at a receiver) of a pseudorandom binary sequence with a satellite-transmitted copy of the same sequence; because the satellite is far from the receiver, the signal transmitted by the satellite is delayed. By delaying the local copy of the sequence to match up with the satellite-transmitted copy, the time it takes the signal to travel from the satellite to the receiver can be found, which can in turn be used to calculate the distance between the satellite and receiver. By performing this process for multiple satellites (typically four or more), a position of the receiver relative to the satellites can be found, which can in turn be used to find the position in a particular geographic coordinate system (e.g., latitude, longitude, and elevation). Typical GNSS systems can achieve at best $2m$ accuracy in positioning.

For many applications (e.g., guidance for human-carrying autonomous vehicles/drones/agricultural equipment, GPS/GNSS research, surveying), this level of accuracy is woefully inadequate. In response, two position correction algorithms have been developed: precise point positioning (PPP) and real time kinematic (RTK).

Instead of solely using the positioning code broadcast by satellites, PPP and RTK also make use of satellite signal carrier phase to determine position. While much higher accuracy is possible using carrier phase data, accurately determining position of a mobile receiver (i.e., the receiver for which position is to be calculated) requires accounting for a number of potential sources of error. Further, carrier phase measurements are ambiguous; because the carrier signal is uniform, it may not be possible to differentiate between a phase shift of $\varphi$ and $2\pi N+\varphi$ using phase measurements alone, where N is an integer. For example, it may be difficult to determine the difference between a phase shift of $\pi$ radians and a phase shift of $3\pi$ radians (or $-7\pi$, $5\pi$, etc.).

PPP attempts to solve this issue by explicitly modeling the error present in mobile receiver phase and code measurements. Some errors are global or nearly global (e.g., satellite orbit and clock errors); for these errors, PPP typically uses correction data with highly accurate measurements. However, for local errors (i.e., error that is substantially dependent on mobile receiver location), PPP is only capable of very rough modeling. Fortunately, many local errors change slowly in time; resultantly, PPP can achieve high accuracy with only a single receiver, but may require a long convergence time to precisely determine local errors. As the terms are used in the present application, "global error" refers to any error that does not vary substantially across multiple reference stations within a region, while "local error" refers to error that does vary substantially across multiple reference stations (because the error is specific to a reference station and/or because the error varies substantially over position within the region). As this error pertains to positioning, such errors may also be referred to as "global positioning error" and "local positioning error".

RTK avoids a large majority of the modeling present in PPP by use of GNSS reference stations (with precisely known locations); since a reference station is local to the mobile receiver, differencing the reference station and mobile receiver signals can result in greatly reduced error. The result is that RTK solutions can converge much more quickly than PPP solutions (and without the high accuracy global corrections data needed by PPP). However, RTK solutions require the presence of base stations near a mobile receiver.

2. System

A system 100 for distributed dense network processing of satellite positioning data includes a global correction module 110, a plurality of local correction modules 120, and a correction generator 140, as shown in FIG. 1. The system 100 may additionally include one or more interpolators 130. Note that the inter-module connections as shown in FIG. 1 are intended as non-limiting examples, and the components of the system 100 may be coupled in any manner. For example, data from the global correction module no may be used to initialize local correction modules 120, may be passed to the correction generator 140 via local correction modules 120, may be passed directly to the correction generator 140, and/or may be utilized by the system 100 in any other manner.

The system 100 functions to generate correction data to be used by a mobile GNSS (Global Navigation Satellite System) receiver or any other GNSS receiver for which position/velocity/timing data correction is desired. Such a receiver (henceforth referred to as a mobile receiver) may operate on any satellite navigation system; e.g., GPS, GLONASS, Galileo, and Beidou. The correction data is preferably used to improve GNSS solution accuracy, and may take the form of PPP corrections, RTK corrections, or any other type of corrections (discussed in the section on the correction generator 140.

Flexibility in the form of corrections data is an inherent and distinguishing aspect of the system 100 over traditional position correction systems. Rather than attempting to generate corrections solely from a small set of high-quality global reference stations (as in PPP) or by comparing data in mobile receiver/reference station pairs (as in RTK), the system 100 collects data from reference stations (and/or other reference sources), and instead of (or in addition to) applying this data directly to generate connections, the data is used to generate both a global correction model (in the global correction module 110) and a number of local correction models (in local correction modules 120). Output of these models are then passed to the correction generator 140, which can use said output to generate correction data in any form. Further, the correction generator 140 may cache and/or (with use of the interpolator 130 spatially interpolate corrections data to provide high quality corrections to mobile receivers regardless of correction capability (e.g., whether the receiver can process RTK/PPP corrections) and location of individual base stations.

By operating in this manner, the system 100 may provide a set of corrections that (while usable with PPP receivers) suffers from little of PPP's long convergence time issues, with solution complexity scaling directly with the number of reference stations N (unlike RTK, in which solution complexity scales at least with the number of possible pairs; i.e., $N^2$. In fact, many current solutions scale with $N^3$ or worse). Further, since corrections are preferably calculated using local correction models that may depend on any number of single reference stations (rather than specific reference station pairs), corrections are substantially more robust to loss of a base station.

Further, the flexible nature of the system 100 enables some functions (such as spatial interpolation and caching) to be performed much more generally than would be possible with RTK; while the concept of a "virtual reference station" is known within RTK (also referred to as a "pseudo reference station"), virtual reference stations typically involve the interpolation of RTK corrections data in real time (and, as discussed before, error correction scales in complexity with $N^2$). In contrast, interpolation in the system 100 can be limited to specific aspects of global and/or local corrections models, providing more robustness to error and better insight as to error causes. Further, unlike RTK, which requires real-time corrections data, the model-based system 100 may cache or otherwise retain model parameters even when data is limited (e.g., when a reference station suddenly becomes unavailable).

The system 100 is preferably implemented in software as part of a networked distributed computing system, but may additionally or alternatively be implemented in any manner.

The global correction module no functions to maintain one or more global correction models. Global correction models preferably accomplish two functions-correcting for global error (i.e., error in GNSS positioning that does not vary substantially in space) and error-checking/seeding local error estimates (where local error refers to error that does vary substantially in space or per GNSS receiver). Note that seeding here refers to providing a coarse estimate as a starting point for further refinement.

The global correction module 110 preferably takes as input raw data from reference stations and the mobile receiver (e.g., carrier phase data, pseudorange data, reference station location etc.) but may additionally or alternatively take in processed data from reference stations and/or the mobile receiver (e.g., positioning code data) or data from any other source (e.g., PPP global corrections data sources on the internet, calibration data for particular satellites or receiver types from a manufacturer or other source, satellite orbit data, satellite clock data).

The reference stations utilized by the system 100 are preferably public reference stations, but may additionally or alternatively be private reference stations or any other suitable reference stations.

Reference stations preferably have a location known to a high degree of accuracy. Reference station location is preferably the location of the antenna used to receive satellite signals. Reference station location may be determined in any manner yielding a high degree of accuracy; for example, reference station location may be determined by a number of receivers set around the reference station at vertical and horizontal reference points. Note that while reference stations are preferably fixed in location, they may additionally or alternatively be mobile. Station position is preferably re-determined to high accuracy before moved reference stations re-start providing phase data; additionally or alternatively, reference stations may provide phase data before location re-determination (for example, for use in attitude estimation; alternatively, data may be provided but not used). As another alternative, reference stations may not provide absolute location data at all if not needed; for example, absolute location data of the reference station may not be needed for applications including attitude estimation. Note that fixed reference stations may, over time, "self-survey" their own positions to a reasonably high degree of accuracy.

Reference stations preferably provide phase data for multiple satellite signals and the location of the reference station via the internet, but may additionally or alternatively provide data by any other suitable method (e.g., transmission by UHF-band radio modem). Reference station data is preferably made available directly to the system 100, but may additionally or alternatively be processed or aggregated before being made available to the system 100.

Reference stations preferably have one or more satellite receivers and generate corrections based on those receivers. The number and quality of satellite receivers used by a reference station (or other factors, like antenna type/size/location) may determine the accuracy of reference station data. Reference stations (or other sources of reference station data; e.g., a reference source that creates correction data from multiple reference stations) may be ordered or grouped by reference station quality (e.g., accuracy of corrections) and/or locality (e.g., if corrections are desired for a particular mobile receiver, reference stations may be ordered or grouped by distance to that receiver).

The global correction module 110 preferably explicitly models the effects of global parameters on GNSS navigation. These parameters preferably include satellite clock error, satellite orbit error, satellite hardware bias, satellite antenna phase windup, phase center offset (PCO), and phase center variation (PCV) (all of which are per satellite, but generally do not vary spatially), solid earth tides, solid earth pole tides, ocean tidal loading (which vary spatially and temporally, but in a predictable manner), as well as coarse global models of ionospheric and tropospheric effects (in this case, global models may not be accurate enough by themselves to model ionospheric and tropospheric effects, but they provide a starting point for later refinement). Additionally or alternatively, the global correction module 110 may model the effects of any parameters on GNSS signals as received by a mobile receiver or a reference station. The global correction module 110 preferably additionally maintains uncertainty estimates for at least some global parameters; additionally or alternatively, the global correction module 110 may not maintain uncertainty estimates.

Note that for receivers used in generating/updating the global model, the global correction module 110 may additionally or alternatively model effects unique to those receivers; e.g., receiver clock error, receiver hardware bias, and receiver antenna phase windup/PCO/PCV (which are unique to a given receiver but not directly dependent on location).

The plurality of local correction modules 120 function to maintain local correction models. Local correction models preferably correct for spatially local variance of effects on GNSS signals as well as for effects that are specific to particular receivers/reference stations.

Local correction modules 120 preferably correspond to (and receive data from) a single reference station. In some embodiments, a local correction module 120 exists for each reference source or station, such that each local correction module 120 takes input from a unique reference source. Additionally or alternatively, local correction modules 120 may correspond to and/or couple to reference stations in any manner; for example, a local correction module 120 may be used to model a number of reference stations within a particular spatial region. Additionally or alternatively, the system 100 may include one or more local correction modules 120 corresponding to mobile receivers.

A local correction module 120 preferably takes as input raw data from corresponding reference stations/mobile receivers (e.g., carrier phase data, positioning code data, reference station location, pseudorange, navigation data, message data, etc.) but may additionally or alternatively take in processed data from reference stations and/or the mobile receiver (e.g., broadcast ephemerides and almanacs) or data from any other source. The local correction module 120 preferably additionally takes data from the global correction module 120 (e.g., to initialize a local correction model for a new reference station and/or to compensate for global components of local error). Additionally or alternatively, the local correction module 120 may take data from any source (e.g., the local correction module 120 may take in only reference data and not any output of the global correction module 110).

The local correction module 120 preferably explicitly models the effects of local parameters on GNSS navigation. These parameters preferably include tropospheric and ionospheric effects (which are not directly dependent on reference station but vary spatially/temporally), receiver clock error, receiver hardware bias, receiver antenna phase windup/PCO/PCV (which are unique to a given receiver/ antenna but not directly dependent on location), carrier phase ambiguity, and other position error (which covers effects not otherwise explicitly modeled). Additionally or alternatively, the local correction module 120 may model the effects of any parameters on GNSS signals as received by a mobile receiver or a reference station. Like the global correction module no, the local correction module 120 may additionally or alternatively maintain/track parameter uncertainty estimates.

In particular, the local correction module 120 preferably models tropospheric and ionospheric effects as a function of receiver position.

Figure 2A:
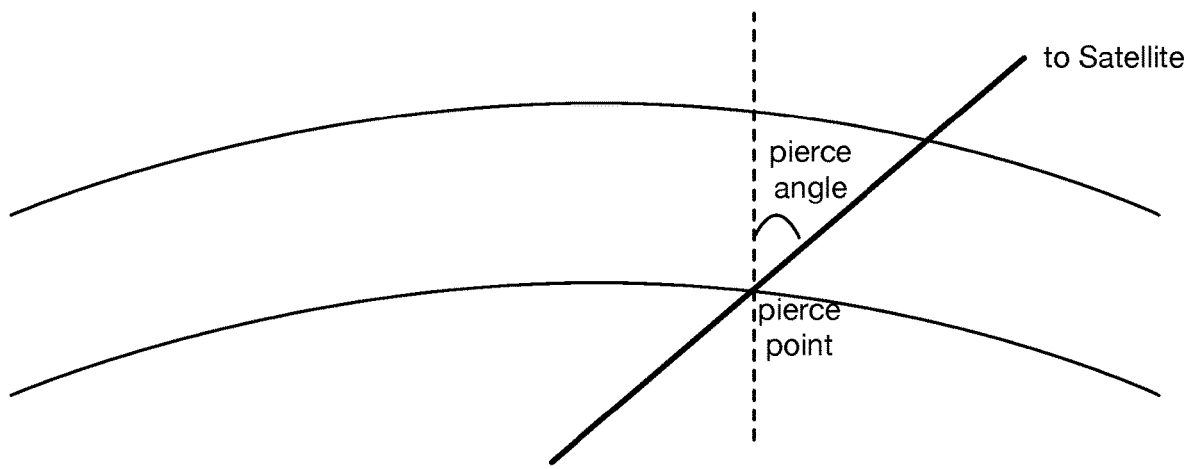
FIGS. 2A and 2B are example representations of ionospheric effect modeling.
Figure 2B:
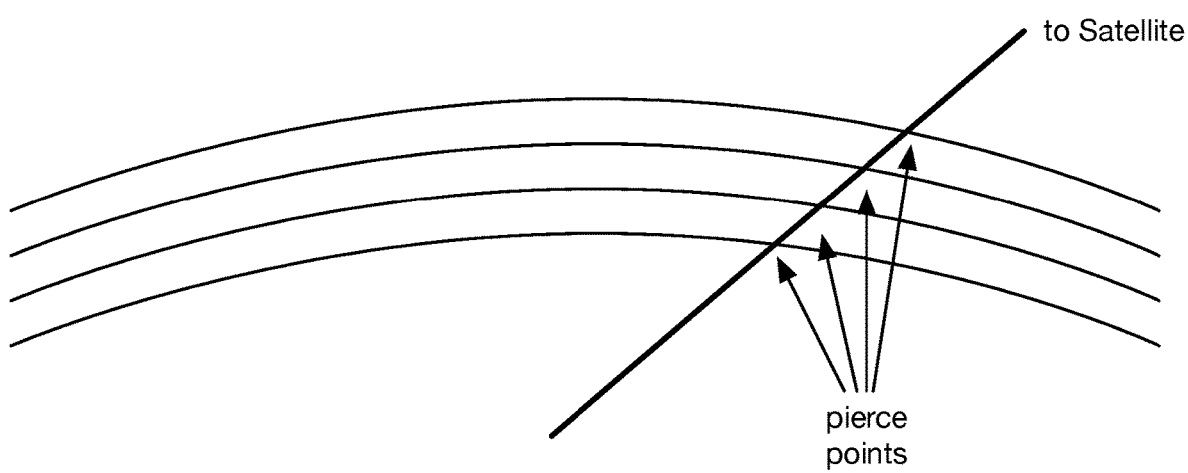
Figure 3:
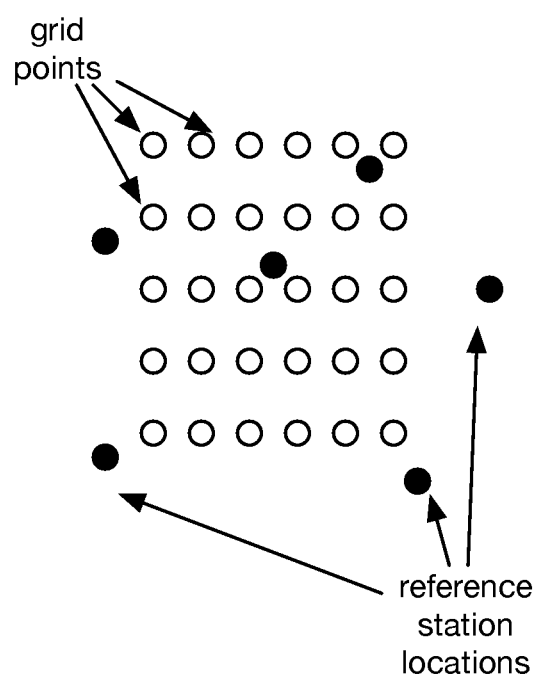
FIG. 3 is an example representation of GNSS effect interpolation.

Ionospheric effects may be difficult to model. It is difficult to differentiate the effects on GNSS signals of ionospheric effects from those of receiver hardware bias; however, ionospheric effects tend to vary more quickly in time than receiver hardware bias. Accordingly, local correction modules 120 may attempt to separate ionospheric effects and effects of hardware bias based on rate of change of the combination of these effects. Further, ionospheric effects vary significantly (and not in an easily predictable manner) based not only on position, but also based on the path a GNSS signal takes through the ionosphere. Accordingly, a model of ionospheric effects may need to take each of these factors into account. In one implementation of an invention embodiment, local correction modules 120 model ionospheric effects per GNSS source (e.g., per satellite) as a function of both position (e.g., pierce point—where the line of sight between a receiver and a satellite intersects the atmospheric layer) and pierce angle (e.g., as an analogue for the signal path), as shown in FIG. 2A. Ionospheric effect may also be modeled with respect to frequency. Further, the ionosphere is preferably modeled as one or more thin shells; however, the ionosphere may be additionally or alternatively modeled in any manner. Likewise, ionospheric effects may be modeled in any manner; as opposed to modeling ionospheric effects as a function of position and angle, ionospheric effects may be modeled based on the set of pierce positions for each shell of the ionospheric model, as shown in FIG. 2B.

In contrast, tropospheric effects are not substantially variant in frequency (for most satellite frequencies); further, while tropospheric effects do depend on angle, they typically do so in a predictable manner. Accordingly, local correction models preferably model tropospheric effects solely based on position (e.g., pierce point) with a static correction for angle (roughly corresponding to $1/\cos\theta$ where $\theta$ is the angle from vertical). Additionally or alternatively, tropospheric effects may be modeled in any manner.

Models of the global correction module no and local correction modules 120 are preferably weakly coupled; that is, changes in model in either case propagate to each other, but in a damped manner (which allows for reaction to changing conditions without bad data or reference station loss causing correction accuracy to break down). Additionally or alternatively, the models may be coupled in any manner (or not at all).

Models of the global correction module no and local correction modules 120 are preferably maintained/updated via a Kalman filter or Gaussian process, but may additionally or alternatively be maintained/updated in any manner.

The global correction module no and local correction modules 120 may use any set(s) of reference sources. For example, the local correction modules 120 may use a strict subset of reference sources used by the global correction module no (e.g., the subset of reference sources within a range threshold of a mobile receiver), or the global correction module no may use a strict subset of reference sources used by the local correction modules 120 (e.g., the subset of local reference sources with highest accuracy). As a second example, the local correction modules 120 and global correction module no may use overlapping reference sources (but neither set a subset of the other). As a third example, the local correction modules 120 and global correction module no may use non-overlapping sets of reference sources (i.e., they do not share a reference source). Likewise, these reference sources may receive satellite information from any set(s) of satellites.

The output of the global correction module 110 and local correction modules 120 may be referred to as "pre-corrections" and may be generated in any form usable by the correction generator 140 to generate correction data. Pre-corrections generated by the global correction module 110 may be referred to as "global pre-corrections", while pre-corrections generated by a local correction module 120 may be referred to as "local pre-corrections".

In a variation of an invention embodiment, the global correction module no includes a differenced ambiguity fixer (DAF) 111 that calculates carrier phase ambiguity for some reference station pairs. This differenced ambiguity fixer may be used, for instance, to help initialize new reference stations in global and local models more rapidly. Alternatively, the DAF 111 may be independent of the global correction module 110.

The interpolator 130 functions to interpolate spatially variant effects of the system 100. In particular, the interpolator 130 preferably functions to transform per reference station models of local tropospheric and ionospheric effects into a local (reference-station independent, but position dependent) model of local tropospheric and ionospheric effects. For example, the interpolator 130 may transform a set of tropospheric effect models corresponding to individual reference locations (each having a known position) to a regularly spaced grid. Additionally or alternatively, the interpolator 130 may function in any manner (e.g., by creating a continuous interpolated model of tropospheric/ionospheric effects rather than a discrete grid, or using some other arrangement of discrete points than a grid pattern). Note that any interpolation technique may be used; for example, kriging may be used (this technique has the advantage of also predicting uncertainty at the interpolated points). In general, the local position dependent model may be referred to as a "unified position-based model" (since it unifies the output of multiple models corresponding to individual reference sources).

The interpolator 130 may additionally or alternatively function to separate ionospheric effects and effects of hardware bias; for example, local correction modules 120 may output to the interpolator 130 both ionospheric and hardware bias estimates (optionally including a term characterizing the correlation between these estimates), and from these estimates attempt to fit a unified (spatially variant) ionospheric model to the data (after which hardware bias estimates for each reference source may be refined). For example, each local correction module 120 ($LCM_i$) may output an ionospheric correction $I_i(x,y,z)$ and a hardware bias correction $H_i$. At the local correction module 120 these corrections may be improperly separated; e.g., $I_i=I_i(ideal)+\Delta_i$, $H_i=H_i(ideal)-\Delta_i$, but because the ionospheric estimates should fit the same model, the interpolator 130 can use measurements from multiple reference sources to refine estimates of both ionospheric correction and hardware bias correction.

The correction generator 140 functions to generate corrections to be used by the mobile receiver. The correction generator 140 preferably generates corrections based on output of the global correction module 110 and the local correction modules 120 for a mobile receiver in a form usable by the mobile receiver. For example, if the mobile receiver can accept PPP corrections, the correction generator 140 may send corrections in the form of PPP corrections (though, in contrast to true PPP corrections, the corrections generated by the correction generator 140 may depend upon receiver position estimate or another spatial term). Additionally or alternatively, the correction generator 140 may send corrections in the form of RTK corrections (e.g., of a virtual reference station), or in any other form (e.g., some sort of local coefficients that are part of a local model). Note that local and global corrections may happen in any order (and may be synchronous or asynchronous). The correction generator 140 may additionally or alternatively send or use correction data in any manner to correct position data (e.g., the correction generator 140 may take as input position data and generate corrected position data rather than a positioning correction to be implemented by, say, a mobile receiver).

The correction generator 140 preferably caches model output and generates corrections using this cache. Accordingly, in the absence of some real-time data, cached data may be substituted (not possible in traditional RTK). Additionally or alternatively, new parameters may be estimated based on a predicted variation in time (e.g., predicted from cached values), or the correction generator 140 may not rely on cached and/or predicted outputs.

The correction generator 140 may additionally or alternatively calculate estimated uncertainty in the generated corrections given uncertainty in the input parameters (traditional PPP/RTK solutions are not capable of doing this).

2. Method

Figure 4:
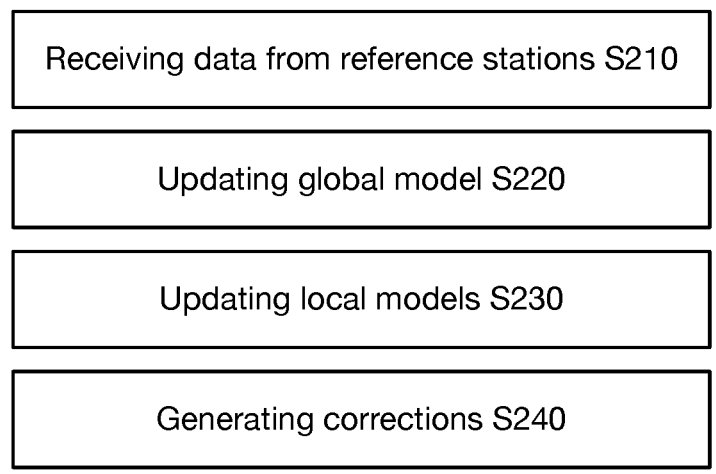
FIG. 4 is a chart representation of a method of an invention embodiment.

A method 200 for distributed dense network processing of satellite positioning data includes receiving data from a set of reference stations S210, updating a global GNSS correction model S220, updating a set of local GNSS correction models S230, and generating GNSS corrections S240, as shown in FIG. 4.

The method 200 preferably functions in a substantially similar manner to the system 100.

Receiving data from a set of reference stations S210 functions to receive input data used to update global and local GNSS correction models, substantially similar to as described in the system 100.

Updating a global GNSS correction model S220 functions to update a global correction model substantially similar to that of the global correction module 110; this model preferably accomplishes two functions—correcting for global error (i.e., error in GNSS positioning that does not vary substantially in space) and error-checking/seeding local error estimates. Updates are preferably performed as described in the system 100 description.

Updating a set of local GNSS correction models S230 functions to update local correction models substantially similar to that of the local correction module 120; these models preferably correct for spatially local variance of effects on GNSS signals as well as for effects that are specific to particular receivers/reference stations. Updates are preferably performed as described in the system 100 description.

Generating GNSS corrections S240 functions to generate corrections from global and local correction models to be used by a mobile receiver. Generating GNSS corrections preferably includes generating corrections as described in the sections on the correction generator 14o; additionally or alternatively, as part of this generation process, S240 may include performing interpolation (as described in the section on the interpolator 130). Likewise, S240 may include caching model output and generating corrections from this cache. Accordingly, in the absence of some real-time data, cached data may be substituted (this is not possible in traditional RTK).

The method 200 is preferably implemented by the system 100 but may additionally or alternatively be implemented by any system for distributed dense network processing of satellite position data.

The methods of the preferred embodiment and variations thereof can be embodied and/or implemented at least in part as a machine configured to receive a computer-readable medium storing computer-readable instructions. The instructions are preferably executed by computer-executable components preferably integrated with a system for distributed dense network processing of satellite position data. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A system for generating satellite positioning corrections for a mobile receiver comprising:
   a global correction module that receives, from a first set of reference sources, at least one of positioning code data and carrier phase data; wherein the positioning code data and carrier phase data from the first set of reference sources results from the reception of satellite signals from a first set of satellites at the first set of reference sources; wherein the global correction module generates a set of global pre-corrections;
   a set of local correction modules that receive, from a second set of reference sources, at least one of positioning code data and carrier phase data; wherein the positioning code data and carrier phase data from the second set of reference sources results from the reception of satellite signals from a second set of satellites at the second set of reference sources; wherein each local correction module of the set takes input from a unique reference source; wherein each local correction module of the set generates a set of local pre-corrections;
   a local modeler coupled to a plurality of the local correction modules; wherein the local modeler produces a spatial local model of the local pre-corrections; wherein the local modeler comprises an interpolator, and wherein the spatial local model is a spatially interpolated local model of the local pre-corrections; wherein the spatially interpolated local model comprises uncertainty estimates for each individual reference location within the spatially interpolated local model; and
   a correction generator that generates a positioning correction of the mobile receiver from the set of global pre-corrections and the spatial local model.

2. The system of claim 1, wherein kriging is used to generate the spatially interpolated local model; wherein the interpolator produces the spatially interpolated local model from the output of the plurality of local correction modules by transforming models corresponding to individual reference locations to a unified position-based model.

3. The system of claim 1, wherein the local modeler receives hardware bias effect data and atmospheric effect data from each of the plurality of local correction modules; wherein the local modeler refines the spatial local model of atmospheric effects using both the hardware bias effect data and the atmospheric effect data.

4. The system of claim 1, wherein the global correction module, the local correction module, the local modeler, and the correction generator run on a remote server.

5. The system of claim 1, wherein the global correction module generates the set of global pre-corrections based on modeling of global positioning error; wherein modeling of global positioning error includes compensating for satellite clock error, satellite orbit error, satellite hardware bias, phase center offset (PCO), and phase center variation (PCV) for each of a set of satellites; wherein the set of satellites is used to generate a position of the mobile receiver.

6. The system of claim 5, wherein modeling of global positioning error further includes compensating for solid earth tides, solid earth pole tides, and ocean tidal loading corresponding to a given time and spatial region; wherein the position of the mobile receiver is calculated for the given time and spatial region.

7. The system of claim 1, wherein the global correction module generates uncertainty estimates for at least one global pre-correction from the set of global pre-corrections; wherein the uncertainty estimates are based on uncertainty estimates for at least one global parameter.

8. A system for generating satellite positioning corrections for a mobile receiver comprising:
   a global correction module that receives, from a first set of reference sources, at least one of positioning code data and carrier phase data; wherein the positioning code data and carrier phase data from the first set of reference sources results from the reception of satellite signals from a first set of satellites at the first set of reference sources; wherein the global correction module generates a set of global pre-corrections based on modeling of global positioning error; wherein modeling of global positioning error includes compensating for atmospheric effects corresponding to a given time and spatial region; wherein the global correction module compensates for the atmospheric effects by generating a coarse global model and passing the coarse global model and global pre-correction data to a set of local correction modules;
   a set of local correction modules, wherein each local correction module:
      receives, from a unique reference source from a second set of reference sources, at least one of positioning code data and carrier phase data, wherein the positioning code data and carrier phase data from the second set of reference sources results from the reception of satellite signals from a second set of satellites at the second set of reference sources;
      applies a static correction for pierce angle for lines of sight between the mobile receiver and each of the second set of satellites;
      compensates for the atmospheric effects by refining the coarse global model; and
      utilizes the global pre-correction data to generate a set of local pre-corrections; and a correction generator that generates a positioning correction for the mobile receiver based on the set of global pre-corrections, the set of local pre-corrections, and the static correction;

wherein a position of the mobile receiver is calculated for the given time and spatial region.

9. The system of claim 8, wherein the static correction is inversely proportional to cosine of the pierce angle.

10. The system of claim 8, wherein the set of local correction modules compensates for the atmospheric effects for each of a set of satellites; wherein the set of satellites is used to generate the position of the mobile receiver.

11. The system of claim 10, wherein the atmospheric effects comprise ionospheric effects, and wherein the set of local correction modules models the ionospheric effects for each of the set of satellites as a function of pierce point and the pierce angle for lines of sight between the mobile receiver and each of the set of satellites.

12. The system of claim 11, wherein the set of local correction modules compensates for the ionospheric effects by modeling Earth's ionosphere as one or more thin shells.

13. The system of claim 12, wherein the set of local correction modules further compensates for the ionospheric effects for each of the set of satellites dependent on signal transmission frequency of each of the set of satellites.

14. The system of claim 8, wherein the global correction module, the local correction module, and the correction generator run on a remote server.

15. The system of claim 8, wherein the local correction module generates uncertainty estimates for at least one local pre-correction from the set of local pre-corrections; wherein the uncertainty estimates are based on uncertainty estimates for at least one local parameter.

16. A system for generating satellite positioning corrections for a mobile receiver comprising:

a global correction module that receives, from a first set of reference sources, at least one of positioning code data and carrier phase data; wherein the positioning code data and carrier phase data from the first set of reference sources results from the reception of satellite signals from a first set of satellites at the first set of reference sources; wherein the global correction module generates a set of global pre-corrections;

a local correction module that:
  receives, from a second set of reference sources, at least one of positioning code data and carrier phase data, wherein the positioning code data and carrier phase data from the second set of reference sources results from the reception of satellite signals from a second set of satellites at the second set of reference sources;
  applies a static correction for pierce angle for lines of sight between the mobile receiver and each of the second set of satellites; and
  generates a set of local pre-corrections;

a local modeler coupled to the local correction modules; wherein the local modeler produces a spatial local model of the set of local pre-corrections; wherein the local modeler comprises an interpolator, and wherein the spatial local model is a spatially interpolated local model of the set of local pre-corrections; wherein the spatially interpolated local model comprises uncertainty estimates for each individual reference location within the spatially interpolated local model; and a correction generator that generates a positioning correction for the mobile receiver based on the set of global pre-corrections, the set of local pre-corrections, and the static correction.

\* \* \* \* \*

(12) EX PARTE REEXAMINATION CERTIFICATE (12993rd)
United States Patent
Noble et al.

(10) Number: US 11,061,141 C1
(45) Certificate Issued: Jul. 24, 2025

(54) SYSTEMS AND METHODS FOR DISTRIBUTED DENSE NETWORK PROCESSING OF SATELLITE POSITIONING DATA

(71) Applicant: Swift Navigation, Inc., San Francisco, CA (US)

(72) Inventors: Fergus Noble, San Francisco, CA (US); Anthony Cole, San Francisco, CA (US)

(73) Assignee: SWIFT NAVIGATION, INC., San Francisco, CA (US)

Reexamination Request:
No. 90/019,714, Oct. 29, 2024

Reexamination Certificate for:
Patent No.: 11,061,141
Issued: Jul. 13, 2021
Appl. No.: 16/589,932
Filed: Oct. 1, 2019

Related U.S. Application Data

(63) Continuation of application No. 16/195,427, filed on Nov. 19, 2018, now Pat. No. 10,473,790.

(60) Provisional application No. 62/587,741, filed on Nov. 17, 2017.

(51) Int. Cl.
*G01S 19/04* (2010.01)
*G01S 19/06* (2010.01)
*G01S 19/07* (2010.01)
*G01S 19/25* (2010.01)
*G01S 19/40* (2010.01)

(52) U.S. Cl.
CPC ............ *G01S 19/072* (2019.08); *G01S 19/04* (2013.01); *G01S 19/06* (2013.01); *G01S 19/07* (2013.01); *G01S 19/256* (2013.01); *G01S 19/40* (2013.01)

(58) Field of Classification Search
None
See application file for complete search history.

(56) References Cited

To view the complete listing of prior art documents cited during the proceeding for Reexamination Control Number 90/019,714, please refer to the USPTO's Patent Electronic System.

*Primary Examiner* — Nick Corsaro

(57) ABSTRACT

A system for generating satellite positioning corrections includes a global correction module that generates a set of global pre-corrections based on modeling of global positioning error, a set of local correction modules that, for each local correction module of the set, takes input from a unique reference source and generates a set of local pre-corrections based on modeling of local positioning error; and a correction generator that generates a positioning correction from the set of global pre-corrections and the sets of local pre-corrections to correct a position of the mobile receiver.

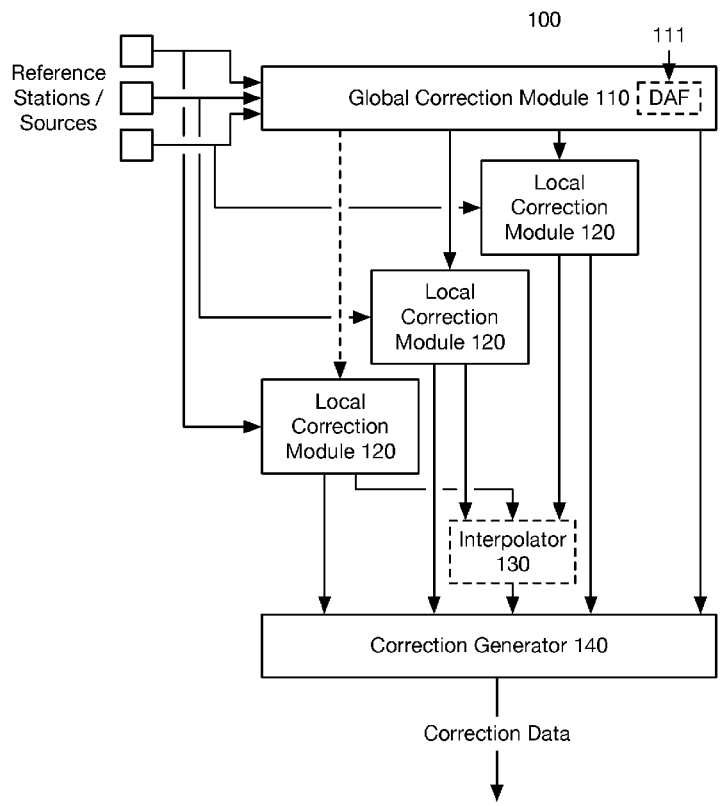

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-16 is confirmed.

\* \* \* \* \*